US009022390B2

(12) United States Patent
Amador

(10) Patent No.: US 9,022,390 B2
(45) Date of Patent: May 5, 2015

(54) THREADED SEAL FOR A GAS TURBINE ENGINE

(75) Inventor: Armando Amador, Wethersfield, CT (US)

(73) Assignee: United Technologies Corporation, Hartford, CT (US)

(*) Notice: Subject to any disclaimer, the term of this patent is extended or adjusted under 35 U.S.C. 154(b) by 308 days.

(21) Appl. No.: 13/603,768

(22) Filed: Sep. 5, 2012

(65) Prior Publication Data
US 2014/0062029 A1 Mar. 6, 2014

(51) Int. Cl.
F02C 7/28 (2006.01)
F01D 11/02 (2006.01)
F16J 15/44 (2006.01)

(52) U.S. Cl.
CPC .............. F02C 7/28 (2013.01); F16J 15/444 (2013.01); F01D 11/02 (2013.01)

(58) Field of Classification Search
USPC ................ 277/411–412, 414–415, 418–420
See application file for complete search history.

(56) References Cited

U.S. PATENT DOCUMENTS

| 924,896 | A | * | 6/1909 | Emmet | ............... 27/29 |
| 2,936,715 | A | | 5/1960 | Southam et al. | |
| 4,521,026 | A | * | 6/1985 | Eide | ............... 277/430 |
| 4,531,746 | A | * | 7/1985 | Amdall et al. | ............... 277/347 |
| 5,314,304 | A | | 5/1994 | Wiebe | |
| 6,039,535 | A | * | 3/2000 | Kobayashi et al. | ........ 415/172.1 |
| 7,008,201 | B2 | | 3/2006 | Heizer | |
| 7,314,218 | B2 | * | 1/2008 | Hughes | ............... 277/349 |
| 7,836,591 | B2 | | 11/2010 | Allen et al. | |
| 8,002,286 | B1 | * | 8/2011 | El-Aini et al. | ............... 277/412 |
| 8,376,369 | B2 | * | 2/2013 | London et al. | ............... 277/559 |
| 2003/0042685 | A1 | | 3/2003 | Sanders et al. | |
| 2005/0129561 | A1 | | 6/2005 | Heizer | |
| 2008/0260523 | A1 | | 10/2008 | Alvanos et al. | |

FOREIGN PATENT DOCUMENTS

GB 634554 3/1950

OTHER PUBLICATIONS

International Search Report and Written Opinion from PCT Application Serial No. PCT/US2013/056233, dated Nov. 1, 2013, 13 pages.

* cited by examiner

*Primary Examiner* — Vishal Patel
(74) *Attorney, Agent, or Firm* — Kinney & Lange, P.A.

(57) ABSTRACT

A seal assembly includes a first component and a second component of a gas turbine engine. The first component has a threaded portion. The second component interfaces with the threaded portion and together the threaded portion and second component form a seal that restricts fluid flow between a first cavity and a second cavity of the gas turbine engine.

7 Claims, 2 Drawing Sheets

THREADED SEAL FOR A GAS TURBINE ENGINE

BACKGROUND

The described subject matter relates generally to gas turbine engines and more particularly, to seal assemblies in gas turbine engines.

Seals such as labyrinth seals and brush seals are commonly used in gas turbine engines and other assemblies to restrict the escape of a working medium (e.g. air) from the main flowpath through a gap between a stationary part and a rotating part. Labyrinth seals are typically comprised of a series of knife edge features that can either contact an abradable surface or act as a non-contacting seal by providing a close tolerance gap to an adjacent journal.

In one specific application, labyrinth seals are used to separate the oil wetted environment of a bearing compartment from the surrounding air filled cavities and prevent oil from weeping out. Additionally, labyrinth seals are used to minimize the entry of air from entering the bearing compartment in amounts greater than the bearing and lubrication system of the gas turbine engine can handle. To achieve this function, labyrinth seals create a meandering pathway to help prevent undesirable amounts of leakage of oil out of or flow of air into the bearing compartment.

Although generally very useful, labyrinth seals typically allow for greater leakage than other forms of compartmental sealing like carbon seals. Thus, the use of labyrinth seals is constrained to certain portions of the engine where extra leakage will not compromise performance, engine functionality, or customer requirements. Additionally, labyrinth seals can experience problems at ground idle conditions where the delta pressure developed across the labyrinth seal becomes too low. In such scenarios, the propensity for oil to escape the bearing compartment increases. Depending on the location of the labyrinth seal in relation to bleed air directed from the gas turbine engine to passengers, this oil weepage can cause passenger discomfort at the smell of oil.

SUMMARY

A seal assembly includes a first component and a second component of a gas turbine engine. The first component has a threaded portion. The second component interfaces with the threaded portion and together the threaded portion and the second component form a seal that restricts fluid flow between a first cavity and a second cavity of the gas turbine engine.

In another aspect an apparatus includes a first component with a threaded portion and one or more knife edges therealong. The threaded portion is disposed immediately adjacent the one or more knife edges.

In yet another aspect, a gas turbine engine includes a rotor component and a stator component. The rotor component has a threaded portion and one or more knife edges therealong. The stator component has an abradable portion that interfaces with the threaded portion and the one or more knife edges. Together the threaded portion, the one or more knife edges, and the abradable portion form a seal that restricts fluid flow between a first cavity and a second cavity of the gas turbine engine.

DETAILED DESCRIPTION

The invention relates to seal assembly designs for both air to oil and air to air applications within a gas turbine engine. The seal assemblies are adapted to provide a seal between a rotor component and a stator component, thereby more effectively restricting/containing air and/or oil flow between cavities within the gas turbine engine. More particularly, each seal assembly includes threads that are used in addition to or in alternative to the knife edges of typical labyrinth seals. Incorporating the threads into the seal assembly design allows the seal assembly to be more effective at restricting/containing the undesirable flow of air and/or oil between cavities within gas turbine engine. In one embodiment, the restriction/containment of the undesirable flow is aided by a variable pitch threaded design that creates a region of increased pressure within seal assembly itself. This region(s) of high pressure creates a larger pressure differential which further discourages the migration of oil and/or air across the seal. Incorporating threads into the seal assemblies not only allows for more effective sealing capability but further allows the seal assemblies to be of a more compact design, thereby reducing the size and weight of the seal assemblies when compared to conventional labyrinth seal designs. Additionally, because the seal assemblies are more effective at forming a seal than conventional designs, air previously used for buffering to create a cavity of higher pressure relative to a cavity of lower pressure can be used for alternative purposes such as to generate increased engine thrust and efficiency by means of metering of the buffer system.

Figure 1:
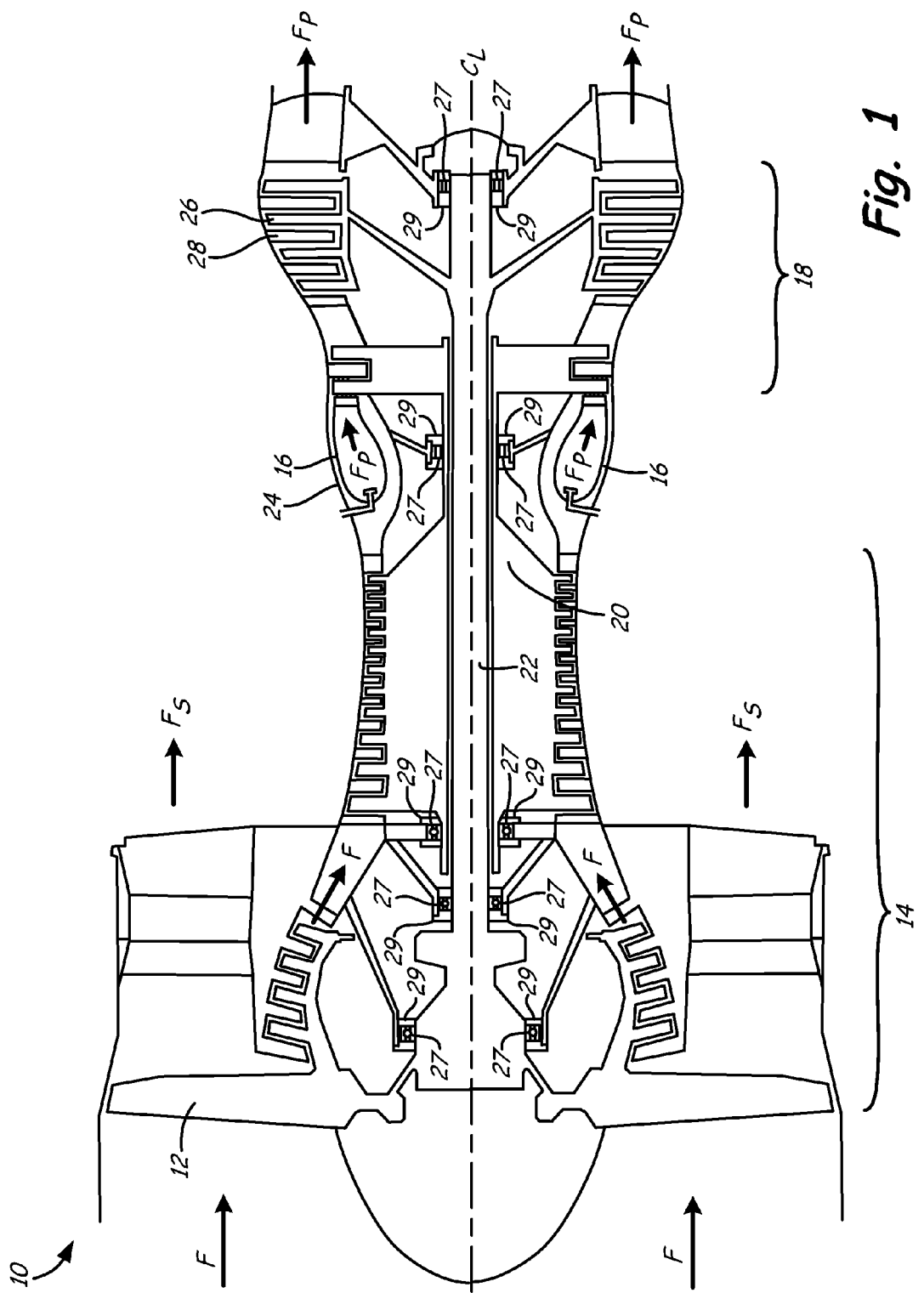
FIG. 1 is a longitudinal sectional view along an engine center line of a gas turbine engine.

FIG. 1 is a representative illustration of a gas turbine engine 10 including a seal assembly of the present invention. The view in FIG. 1 is a longitudinal sectional view along an engine center line. FIG. 1 shows gas turbine engine 10 including a fan blade 12, a compressor 14, a combustor 16, a turbine 18, a high-pressure rotor 20, a low-pressure rotor 22, and an engine casing 24. Turbine 18 includes rotor stages 26 and stator stages 28. Gas turbine engine 10 rotor and stator components interface on bearings 27 disposed in bearing compartments 29.

As illustrated in FIG. 1, fan blade 12 extends from fan hub, which is positioned along engine center line $C_L$ near a forward end of gas turbine engine 10. Compressor 14 is disposed aft of fan blade 12 along engine center line $C_L$, followed by combustor 16. Turbine 18 is located adjacent combustor 16, opposite compressor 14. High-pressure rotor 20 and low-pressure rotor 22 are mounted for rotation about engine center line $C_L$. High-pressure rotor 20 connects a high-pressure section of turbine 18 to compressor 14. Low-pressure rotor 22 connects a low-pressure section of turbine 18 to fan blade 12. Rotor stages 26 and stator stages 28 are arranged throughout turbine 18 in alternating rows. Rotor stages 26 connect to high-pressure rotor 20 and low-pressure rotor 22. Engine casing 24 surrounds turbine engine 10 providing structural support for compressor 14, combustor 16, and turbine 18, as well as containment for cooling air flows, as described below. Bearings 27 are disposed along the axial length of rotor components such as low-pressure rotor 22 and high-pressure rotor 20 within bearing compartments 29.

In operation, air flow F enters compressor 14 after passing between fan blades 12. Air flow F is compressed by the rotation of compressor 14 driven by the low compressor 30 and high-pressure rotor 20. The compressed air from compressor 14 is divided, with a portion going to combustor 16, and a portion employed for cooling components, buffering, and other purposes. Compressed air and fuel are mixed and ignited in combustor 16 to produce high-temperature, high-pressure combustion gases Fp. Combustion gases Fp exit combustor 16 into turbine section 18. Stator stages 28 properly align the flow of combustion gases Fp for an efficient attack angle on subsequent rotor stages 26. The flow of combustion gases Fp past rotor stages 26 drives rotation of both low-pressure rotor 20 and high-pressure rotor 22. High-pressure rotor 20 drives a high-pressure portion of compressor 14, as noted above, and low-pressure rotor 22 drives fan blades 12 to produce thrust Fs from gas turbine engine 10. Rotor components such as low-pressure rotor 20 and high-pressure rotor 22 are supported within gas turbine engine 10 on stator components by bearings 27. Bearings 27 are disposed within bearing compartments 29, which are used to contain lubricating oil for bearings 27 operation.

Although embodiments of the present invention are illustrated for a turbofan gas turbine engine for aviation use, it is understood that the present invention applies to other aviation gas turbine engines and to industrial gas turbine engines as well. Additionally, while the seal assembly is discussed with reference to an air to oil application, it is also contemplated for use in air to air applications as well.

Figure 2:
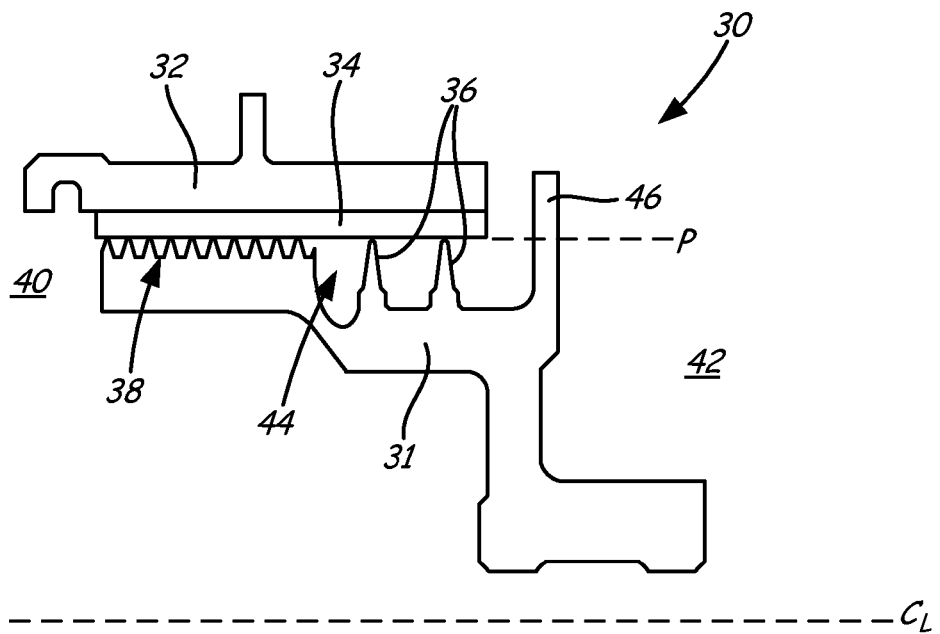
FIG. 2 is a schematic view of a first embodiment of a seal assembly formed between a rotor component and a stator component of the gas turbine engine.

FIG. 2 shows a first embodiment of a bearing assembly 30 disposed within gas turbine engine 10. Bearing assembly 30 includes a first component 31 and a second component 32. Second component 32 includes an abradable portion 34. First component 31 includes one or more knife edges 36 and a threaded portion 38. First component 31 and second component 32 are disposed between and form portions of a first cavity 40 and a second cavity 42. First component 31 and second component 32 additionally form an intermediate cavity 44 therebetween.

First component 31 can comprise a portion of low-pressure rotor 20 or high-pressure rotor 22 (FIG. 1). Second component 32 comprises a stator portion of gas turbine engine 10. First component 31 is disposed to interface with second component 32. As shown in FIG. 2, first component 31 extends radially with respect to engine centerline $C_L$ and has a radial flange 46 disposed adjacent and aft of second component 32. First component 31 transitions from the radial section to a generally axial section with one or more knife edges 36 formed thereon. Knife edges 36 extend to and have tips disposed adjacent abradable portion 34 of second component 32. Threaded portion 38 is formed by first component 31 and is disposed adjacent knife edges 36. Threaded portion 38 extends to adjacent abradable portion 34 of second component 32. In the embodiment shown, threaded portion 38 has a constant threaded along an entire axial length. Threaded portion 38 is disposed forward of knife edges 36 between edges 36 and first cavity 40.

Intermediate cavity 44 is formed within seal assembly 30 between first cavity 40 and second cavity 42. More particularly, intermediate cavity is formed between threaded portion 38 and knife edges 36 and abradable portion 34. In the embodiment shown, a tip of knife edges 36 generally aligns along a common outer diametrical extent P with tips of threaded portion 38. Thus, knife edges 36 and threaded portion 38 extend to substantially a same diameter with respect to engine centerline axis $C_L$. As illustrated, common extent P has a small clearance with abradable portion 34. However, the tips of threaded portion 38 and knife edges 36 (as well as second component 32) may experience thermal growth during operation of gas turbine engine 10 so as to move common outer diametrical extent P (as defined by the tips of threaded portion 38 and knife edges 36) to be closer to or overlap with abradable portion 34.

In the embodiment shown in FIG. 2, second cavity 42 can be formed within bearing compartment 29 (FIG. 1) and is partially filled with lubricating oil. As such, seal assembly 30 creates a throttling effect to maintain the oil within second cavity 42 to help lubricate bearings 27 (FIG. 1). Seal assembly 30 is aided by buffer air that keeps first cavity 40 first cavity 40 at a higher pressure than second cavity 42. During operation threaded portion 38 and knife edges 36 can either contact abradable portion 34 or act as non-contacting seals by providing a close tolerance gap thereto. Threaded portion 38 acts to drive air from first cavity 40 toward knife edges 36 to aid with containing oil. If the rotor is rotating clockwise (forward looking aft) then the thread would have a right-hand thread type. Likewise, if the rotor rotates counter clockwise (forward looking aft) the thread would have a left-hand thread. Additionally, threaded portion 38 acts to contain oil that escapes past knife edges 36 to prevent oil from escaping into first cavity 40 and the remainder of gas turbine engine 10. As previously discussed, seal assembly 30 is not only applicable to the air to oil application described herein but is additionally applicable to air to air applications as well. Similarly, it should be understood that in other embodiments threaded portion 38 may comprise the entirety of seal assembly 30 (without knife edges 36) and that threaded portion (and knife edges 36) can be disposed at a clearance to (or interference with) second component 32 as criteria dictate.

Figure 3:
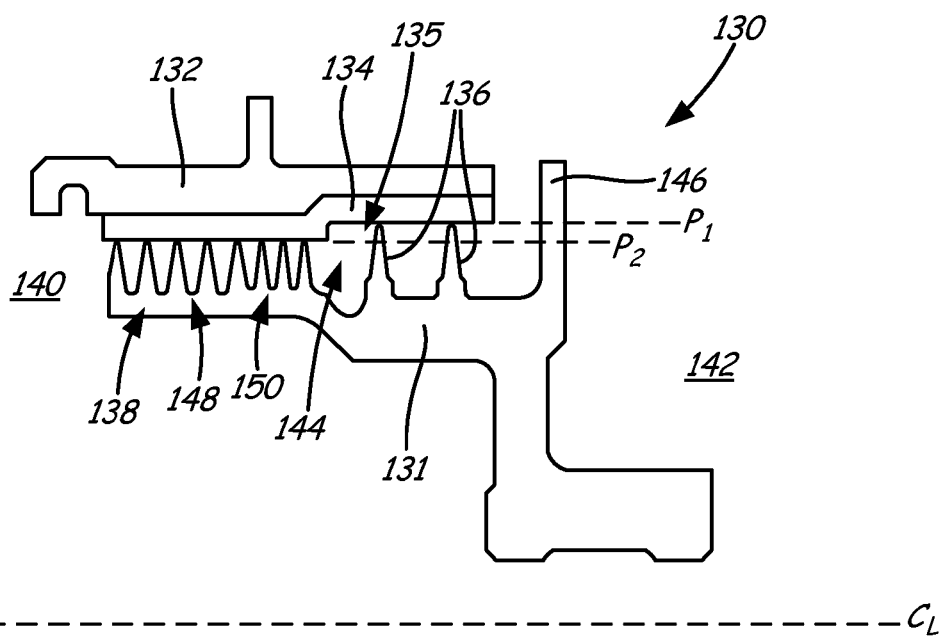
FIG. 3 is a schematic view of a second embodiment of a seal assembly formed between a rotor component and a stator component of the gas turbine engine.

FIG. 3 shows a second embodiment of a bearing assembly 130 for use within gas turbine engine 10. Bearing assembly 130 includes a first component 131 and a second component 132. Second component 132 includes an abradable portion 134. Abradable portion 134 includes a recessed section 135. First component 131 includes one or more knife edges 136 and a threaded portion 138. First component 131 and second component 132 are disposed between and form portions of a first cavity 140 and a second cavity 142. First component 131 and second component 132 additionally form an intermediate cavity 144 therebetween.

First component 131 can comprise a portion of low-pressure rotor 20 or high-pressure rotor 22 (FIG. 1). Second component 132 comprises a stator portion of gas turbine engine 10. First component 131 is disposed to interface with second component 132. As shown in FIG. 3, first component 131 extends radially with respect to engine centerline $C_L$ and has a radial flange 146 disposed adjacent an aft portion of second component 132.

First component 131 transitions from the radial section to a generally axial section with one or more knife edges 136 formed thereon. One or more knife edges 136 extend to and have tips disposed adjacent abradable portion 134 of second component 132. Threaded portion 138 is formed by first component 131 and is disposed adjacent one or more knife edges 136. Threaded portion 138 extends to adjacent abradable portion 134 of second component 132. Threaded portion 138 is disposed forward of one or more knife edges 136 between one or more knife edges 136 and first cavity 140. In the embodiment shown, threaded portion 138 has a variable pitch threaded along an entire axial length from forward to aft (i.e. threaded portion transitions rather smoothly from coarser pitch tread to finer pitch thread). Thus, thread portion 138 has a coarser thread 148 adjacent first cavity 140 and a finer thread 150 adjacent one or more knife edges 136. However, in other embodiments threaded portion 138 can have distinction portions of a constant threaded pitch (e.g., coarse or fine) and than abruptly or otherwise transitions to a different threaded pitch (e.g., coarse or fine).

Intermediate cavity 144 is formed within seal assembly 130 between first cavity 140 and second cavity 142. More particularly, intermediate cavity 144 is formed between threaded portion 138 and one or more knife edges 136 and abradable portion 134. In the embodiment of FIG. 3, threaded portion 138 acts to drive air from first cavity 140 toward one or more knife edges 136 to aid with containing oil. Additionally, the variable pitch of threaded portion 138 acts to boost the pressure within intermediate cavity 144 to a pressure higher than either first cavity 140 or second cavity 142. This is accomplished by disposing threads of finer pitch adjacent intermediate cavity 144 so as to reduce the volume of air passing across threaded portion 138 and entering intermediate cavity 144. By increasing the pressure of intermediate cavity 144, intermediate cavity 144 (and threaded portion 38) act to contain oil that escapes past one or more knife edges 36 to prevent oil from escaping into first cavity 40 and the remainder of gas turbine engine 10. If the rotor is rotating clockwise (forward looking aft) then the thread would have a right-hand thread type. Likewise, if the rotor rotates counter clockwise (forward looking aft) the thread would have a left-hand thread.

In the embodiment shown, tips of the knife edges 136 extend to a greater diameter about centerline axis $C_L$ than the tips of threaded portion 138. This is accomplished because abradable portion has recessed section 135 disposed to interface with one or more knife edges 136. Therefore, knife edges 136 and threaded portion 138 do not share a common outer diameter extent with respect to engine centerline axis $C_L$. Instead the tips of the one or more knife edges 136 are disposed to reach a first diametrical extent $P_1$ that differs from a second diametrical extent $P_2$ that aligns with tips of the threaded portion 138. As illustrated in FIG. 3, the tips of knife edges 136 and threaded portion 138 have a small clearance with abradable portion 134. However, the tips of threaded portion 138 and knife edges 136 (as well as second component 132) may experience thermal growth during operation of gas turbine engine 10 so as to first and second planes $P_1$ and $P_2$ (as defined by the tips of threaded portion 138 and knife edges 136) to be closer to or overlap with abradable portion 134.

In the embodiment shown in FIG. 3, second cavity 142 can be formed within bearing compartment 29 (FIG. 1) and is partially filled with lubricating oil. As such, seal assembly 130 creates a throttling effect to maintain the oil within second cavity 142 to help lubricate bearings 27 (FIG. 1). Seal assembly 130 is aided by buffer air that maintains first cavity 140 at a higher pressure than second cavity 142. During operation threaded portion 138 and one or more knife edges 136 can either contact abradable portion 134 or act as non-contacting seals by providing a close tolerance gap thereto. Threaded portion 138 acts to drive air from first cavity 140 toward one or more knife edges 136 to aid with containing oil. Additionally, the variable pitch of threaded portion 138 acts to boost the pressure within intermediate cavity 144 to a pressure higher than either first cavity 140 or second cavity 142. This is accomplished by disposing threads of finer pitch adjacent intermediate cavity 144 so as to reduce the volume of air passing across threaded portion 138 and entering intermediate cavity 144. By increasing the pressure of intermediate cavity 144, intermediate cavity 144 (as well as threaded portion 38) act to contain oil that escapes past one or more knife edges 36 to prevent oil from escaping into first cavity 40 and the remainder of gas turbine engine 10. As previously discussed, seal assembly 130 is not only applicable to the air to oil application described herein but is additionally applicable to air to air applications as well. Similarly, it should be understood that in other embodiments threaded portion 138 may comprise the entirety of seal assembly 130 and that threaded portion (and knife edges 136) can be disposed at a clearance to (or interference with) second component 132 as criteria dictate.

The invention relates to seal assembly designs for both air to oil and air to air applications within a gas turbine engine. The seal assemblies are adapted to provide a seal between a rotor component and a stator component, thereby more effectively restricting/containing air and/or oil flow between cavities within the gas turbine engine. More particularly, each seal assembly includes threads that are used in addition to or in alternative to the knife edges of typical labyrinth seals. Incorporating the threads into the seal assembly design allows the seal assembly to be more effective at restricting/containing the undesirable flow of air and/or oil between cavities within gas turbine engine. In one embodiment, the restriction/containment of the undesirable flow is aided by a variable pitch threaded design that creates a region of increased pressure within seal assembly itself. This region(s) of high pressure creates a larger pressure differential that further discourages the migration of oil and/or air across the seal. Incorporating threads into the seal assemblies not only allows for more effective sealing capability but further allows the seal assemblies to be of a more compact design, thereby reducing the size and weight of the seal assemblies when compared to conventional labyrinth seal designs. Additionally, because the seal assemblies are more effective at forming a seal than conventional designs, air previously used for buffering to create a cavity of higher pressure relative to a cavity of lower pressure can be used for alternative purposes such as to generate increased engine thrust and efficiency.

Discussion of Possible Embodiments

The following are non-exclusive descriptions of possible embodiments of the present invention.

A seal assembly includes a first component and a second component of a gas turbine engine. The first component has a threaded portion. The second component interfaces with the threaded portion and together the threaded portion and the second component form a seal that restricts fluid flow between a first cavity and a second cavity of the gas turbine engine.

The seal assembly of the preceding paragraph can optionally include, additionally and/or alternatively, any one or more of the following features, configurations and/or additional components:

A further embodiment of the foregoing seal assembly, wherein the first component comprises a rotor component and the second component comprises a stator component of the gas turbine engine.

A further embodiment of the foregoing seal assembly, wherein the first component comprises a stator component and the second component comprises a rotor component of the gas turbine engine.

A further embodiment of the foregoing seal assembly, wherein one or more knife edges are disposed adjacent the threaded portion.

A further embodiment of the foregoing seal assembly, wherein the one or more knife edges are formed by at least one of the first component and/or second component.

A further embodiment of the foregoing seal assembly, a tip of the one or more knife edges generally has a common outer extent with tips of the threaded portion.

A further embodiment of the foregoing seal assembly, the second component has an abradable portion with a recessed region and wherein a tip of the one or more knife edges is disposed along a first outer extent that differs from a second outer extent of tips of the threaded portion.

A further embodiment of the foregoing seal assembly, wherein the one or more knife edges are disposed downstream of the threaded portion and adjacent the second cavity, and wherein the second cavity comprises a region with a lower pressure than the first cavity.

A further embodiment of the foregoing seal assembly, wherein the threaded portion has a variable pitch.

A further embodiment of the foregoing seal assembly, wherein the variable pitch has a generally smooth transition from a coarser pitch thread to a finer pitch thread, and wherein the finer pitch thread is disposed closer to the one or more knife edges than the coarser pitch thread.

A further embodiment of the foregoing seal assembly, wherein an intermediate cavity is disposed within the seal assembly between the threaded portion and the one or more knife edges, and wherein during operation of the gas turbine engine the intermediate cavity has a higher pressure than both the first cavity and the second cavity.

A further embodiment of the foregoing seal assembly has an apparatus with a first component that has a threaded portion and one or more knife edges therealong. The threaded portion is disposed immediately adjacent the one or more knife edges.

A further embodiment of the foregoing seal assembly, wherein the threaded portion of the apparatus has a variable pitch.

A further embodiment of the foregoing seal assembly, the variable pitch has a generally smooth transition from a coarser pitch thread to a finer pitch thread, and wherein the finer pitch thread is disposed closer to the one or more knife edges than the coarser pitch thread.

A further embodiment of the foregoing seal assembly, the second component has an abradable portion with a recessed region and wherein a tip of the one or more knife edges is disposed along a first outer extent that differs from a second outer extent of tips of the threaded portion.

A further embodiment of the foregoing seal assembly, wherein the first component of the apparatus comprises a rotor component and the second component comprises a stator component of the gas turbine engine.

A further embodiment of the foregoing seal assembly, wherein an intermediate cavity of the apparatus is disposed within the seal assembly between the threaded portion and the one or more knife edges, and wherein during operation of the gas turbine engine the intermediate cavity has a higher pressure than both the first cavity and the second cavity.

A further embodiment of the foregoing seal assembly, wherein the abradable portion of the apparatus has a recessed region and wherein a tip of the one or more knife edges is disposed along a first outer extent that differs from a second outer extent of tips of the threaded portion.

A further embodiment of the foregoing seal assembly, wherein the seal assembly comprises a portion of a gas turbine engine and the gas turbine engine includes a first rotor component and a second stator component. The first component has a threaded portion and one or more knife edges therealong. The second component has an abradable portion that interfaces with the threaded portion and the one or more knife edges. Together the threaded portion, the one or more knife edges, and the abradable portion form a seal that restricts fluid flow between a first cavity and a second cavity of the gas turbine engine.

A further embodiment of the foregoing seal assembly, wherein the seal assembly comprises a portion of a gas turbine engine and the gas turbine engine includes a rotor component and a stator component. The rotor component has a threaded portion and one or more knife edges therealong. The stator component has an abradable portion that interfaces with the threaded portion and the one or more knife edges. Together the threaded portion, the one or more knife edges, and the abradable portion form a seal that restricts fluid flow between a first cavity and a second cavity of the gas turbine engine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal assembly for a gas turbine engine comprising:
a first component having a threaded portion and one or more knife edges disposed adjacent the threaded portion, the threaded portion has a variable pitch, the variable pitch comprises a generally smooth transition from a coarser pitch thread to a finer pitch thread, and wherein the finer pitch thread is disposed closer to the one or more knife edges than the coarser pitch thread;
a second component that interfaces with the threaded portion, wherein together the threaded portion and the second component form a seal that restricts fluid flow between a first cavity and a second cavity;
wherein the second component has an abradable portion with a recessed region and wherein a tip of the one or more knife edges is disposed along a first outer extent that differs from a second outer extent of the tips of the threaded portion; and
wherein the tip of the one or more knife edges is disposed along the recessed region and wherein the threaded portion is disposed away from the recessed region.

2. The seal assembly of claim 1, wherein the first component comprises a rotor component and the second component comprises a stator component of the gas turbine engine.

3. The seal assembly of claim 1, wherein a tip of the one or more knife edges generally has a common outer extent with tips of the threaded portion.

4. The seal assembly of claim 1, wherein the one or more knife edges are disposed downstream of the threaded portion and adjacent the second cavity, and wherein the second cavity comprises a region with a lower pressure than the first cavity.

5. The seal assembly of claim 1, wherein an intermediate cavity is disposed within the seal assembly between the threaded portion and the one or more knife edges, and wherein during operation of the gas turbine engine the intermediate cavity has a higher pressure than both the first cavity and the second cavity.

6. A gas turbine engine having a seal assembly, the seal assembly comprising:
a first component having a threaded portion and one or more knife edges disposed adjacent the threaded portion, the threaded portion has a variable pitch, the variable pitch comprises a generally smooth transition from a coarser pitch thread to a finer pitch thread, and wherein the finer pitch thread is disposed closer to the one or more knife edges than the coarser pitch thread;

a second component that interfaces with the threaded portion, wherein together the threaded portion and the second component form a seal that restricts fluid flow between a first cavity and a second cavity of the gas turbine engine;

wherein the second component has an abradable portion with a recessed region and where a tip of the one or more knife edges is disposed along a first outer extent that differs from a second outer extent of the tips of the threaded portion; and wherein the tip of the one or more knife edges is disposed along the recessed region and wherein the threaded portion is disposed away from the recessed region.

7. The gas turbine engine of claim 6, wherein an intermediate cavity is disposed within the seal assembly between the threaded portion and the one or more knife edges, and wherein during operation of the gas turbine engine the intermediate cavity has a higher pressure than both the first cavity and the second cavity.

* * * * *